United States Patent Office 3,114,767
Patented Dec. 17, 1963

1

3,114,767
PROCESS FOR PRODUCING ACRYLOXYALKOXY-ARYLSULFONIC ACID COMPOUNDS
Edward M. La Combe, Charleston, Byron Stewart, South Charleston, and Walter P. Miller, Charleston, W. Va., assignors to Union Carbide Corporation, a corporation of New York
No Drawing. Filed Feb. 3, 1961, Ser. No. 86,871
3 Claims. (Cl. 260—486)

This invention relates to an improved process for producing acryloxyalkoxyarylsulfonic acid derivatives.

The sulfonation of aromatic compounds is well known, and results in the introduction of a sulfo group (—SO$_3$H) to the aromatic nucleus. Likewise it is known to sulfonate unsaturated aliphatic compounds, and, in this instance, sulfonation occurs across the unsaturated bond. Similarly when an aromatic compound which contains an aryl radical as well as an unsaturated aliphatic radical in the molecule, for example, styrene, vinyl benzoate, m-aminostyrene, or N-vinylacetanilide, is treated with a sulfonating agent, sulfonation will occur either at the unsaturated aliphatic radical to give a monosulfonic acid compound or both at the unsaturated aliphatic radical and the aryl radical to give a disulfonic acid compound. The formation of a monosulfonic acid derivative in which the sulfo group is on the aryl radical alone, from this latter type of compound, has to this date not been possible by direct sulfonation.

It has now been found that certain classes of compounds containing both an aryl nucleus and an unsaturated aliphatic radical in the same molecule can be sulfonated under specially defined conditions such that sulfonation occurs essentially only on the aryl nucleus. The compounds with which this invention is concerned are those compounds in which the aryl radical is activated by an oxygen atom attached thereto, although the process of this invention is equally applicable to the sulfonation of other classes of organic compounds.

In the process of this invention an acryloxyalkoxyaryl compound is sulfonated on the aryl radical thereof using as the sulfonating agent an acetic anhydride-sulfuric acid reagent in which the mole ratio of acetic anhydride to sulfuric acid is closely controlled. The sulfonation can be carried out in the presence of an inert organic diluent or in the absence thereof.

The acryloxyalkoxyarylsulfonic acid compounds produced by this invention can be represented by the general formula:

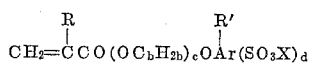

wherein R represents a hydrogen atom, a chlorine atom, or a methyl radical; R′ represents a halogen atom (Cl, Br, F, I), a nitro radical, or an alkyl radical containing from 1 to about 12 carbon atoms, such as methyl, ethyl, propyl, isopropyl, tert.-butyl, n-butyl, pentyl, neopentyl, heptyl, 3-methylheptyl, octyl, 2-ethylhexyl, decyl, isodecyl, dodecyl, and the like; Ar represents a phenylene radical, or a naphthylene radical; X represents a cation, such as a hydrogen atom, an ammonium radical (—NH$_4$), a monovalent metal, a metal acylate radical of the formula —MOacyl in which M is a divalent metal and the acyl group contains from 2 to about 4 carbon atoms, or an organic amine salt group; $b$ is an integer having a value of from 1 to about 4; $c$ is an integer having a value of from 1 to 3; and $d$ is an integer having a value of 1 or 2, preferably 1 when Ar is a phenylene radical and either 1 or 2 when Ar is a naphthylene radical.

2

The acryloxyalkoxybenzenesulfonic acid compounds can be represented by the general formula:

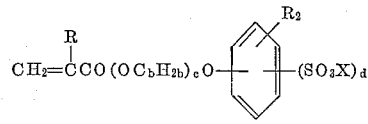

and the acryloxyalkoxynaphthalenesulfonic acid compounds can be represented by the general formula:

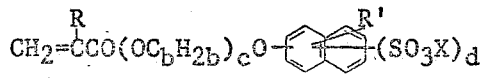

The sulfonation can be carried out by dissolving the starting material, an acryloxyalkoxyaryl compound represented by the general formula:

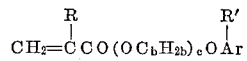

in an inert liquid diluent together with the critical amount of acetic anhydride. This mixture is then cooled, and concentrated sulfuric acid is added to it. Any inert organic solvent can be used as diluent, the only requirements being that it does not react with any of the reactants and that it remains liquid at the reaction temperature. Illustrative of diluents which are suitable, one can mention acetone, acetonitrile, glacial acetic acid, diisopropyl ether, dibutyl ether, ethylene dichloride, and the like.

The mole ratio of acetic anhydride to concentrated sulfuric acid which can be used and still prevent any appreciable sulfonation of the double bond of the acrylyl radical is from about 1.5:1 to about 2.75:1. A mole ratio of 2:1, however, yields optimum sulfonation of the aryl radical and negligible sulfonation of the acrylyl radical. While ratios outside of the stated range can be used they are undesirable from the point of view of yield. Lower ratios lead to poor yields, whereas higher ratios produce a product which is more difficult to separate.

The mole ratio of sulfuric acid to acryloxyalkoxyaryl compound can be varied, as is known to any ordinary scientist skilled in the art, depending on whether one wishes to produce the monosulfonic acid derivative or the disulfonic acid derivative. A mole ratio of about 1:1 favors the production of the monosulfonic acid compound whereas a mole ratio of about 2:1 favors the production of the disulfonic acid compound.

The sulfonation is carried out at a temperature of about −15° C. to about 20° C. Preferably the temperature is maintained at from about −5° C. to 10° C. The compounds of this invention can be used as plasticizers and as intermediates for the production of the corresponding saturated compounds which are suitable for use as detergents and surface active agents.

Illustrative of the acryloxyalkoxyarylsulfonic acid compounds of this invention, in their free acid forms, one can mention:

Ar-(acryloxymethoxy)benzenesulfonic acid,
Ar-(methacryloxymethoxy)benzenesulfonic acid,
Ar-(acryloxymethoxy)naphthalenesulfonic acid,
Ar-(acryloxymethoxy)napathalenesdiulfonic acid,
Ar-(2-acryloxyethoxy)benzenesulfonic acid,
Ar-(2-acryloxyethoxy)nitrobenzenesulfonic acid,
Ar-(2-acryloxyethoxy)chlorobenzenesulfonic acid,
Ar-(2-acryloxyethoxy)benzenedisulfonic acid,
Ar-(2-acryloxyethoxy)naphthalenesulfonic acid,
Ar-(2-acryloxyethoxy)naphthalenedisulfonic acid,
Ar-(2-methacryloxyethoxy)benzenesulfonic acid,
Ar-(2-chloroacryloxyethoxy)benzenesulfonic acid,
Ar-(2-methacryloxyethoxy)naphthalenesulfonic acid,
Ar-(2-methacryloxyethoxy)naphthalenedisulfonic acid,
Ar-(3-acryloxypropoxy)benzenesulfonic acid, Ar-(2-acryloxypropoxy)benzenesulfonic acid,
Ar-(2-acryloxypropoxy)naphthalenedisulfonic acid,
Ar-(3-acryloxypropoxy)naphthalenesulfonic acid,
Ar-(2-acryloxypropoxy)naphthalenesulfonic acid,
Ar-(3-acryloxypropoxy)naphthalenedisulfonic acid,
Ar-(3-methacryloxypropoxy)benzenesulfonic acid,
Ar-(2-methacryloxypropoxy)benzenesulfonic acid,
Ar-(3-methacryloxypropoxy)naphthalenesulfonic acid,
Ar-(3-methacryloxypropoxy)naphthalenedisulfonic acid,
Ar-[2-(2'-acryloxyethoxy)-ethoxy]benzenesulfonic acid,
Ar-[2-(2'-methacryloxyethoxy)-ethoxy]benzenesulfonic acid,
Ar-[2-(2'-acryloxyethoxy)-ethoxy]naphthalenesulfonic acid,
Ar-[2-(2'-acryloxyethoxy)-ethoxy]naphthalenedisulfonic acid,
Ar-[2-(3'-acryloxypropoxy)-ethoxy]benzenesulfonic acid,
Ar-[2-(2'-acryloxypropoxy)-ethoxy]benzenesulfonic acid,
Ar-[2-(3'-methacryloxypropoxy)-ethoxy]benzenesulfonic acid,
Ar-[2-(3'-methacryloxypropoxy)-ethoxy]naphthalenesulfonic acid,
Ar-[2-(3'-methacryloxypropoxy)-ethoxy]naphthalenedisulfonic acid,
Ar-[-(2'-methacryloxypropoxy)-ethoxy]naphthalenedisulfonic acid,
Ar-[3-(2'-acryloxyethoxy)-propoxy]benzenesulfonic acid,
Ar-[3-(2'-methacryloxyethoxy)-propoxy]benzenesulfonic acid,
Ar-[3-(2'-acryloxyethoxy)-propoxy]naphthalenesulfonic acid,
Ar-[3-(2'-acryloxyethoxy)-propoxy]naphthalenedisulfonic acid,
Ar-[3-(2'-methacryloxyethoxy)-propoxy]naphthalenesulfonic acid,
Ar-[3-(2'-methacryloxyethoxy)-propoxy]naphthalenedisulfonic acid,
Ar-[3-(3'-acryloxypropoxy)-propoxy]benzenesulfonic acid,
Ar-[3-(2'-acryloxypropoxy)-propoxy]benzenesulfonic acid,
Ar-[3-(3'-methacryloxypropoxy)-propoxy]benzenesulfonic acid,
Ar-[3-(3'-acryloxypropoxy)-propoxy]naphthalenesulfonic acid,
Ar-[3-(2'-acryloxypropoxy)-propoxy]naphthalenesulfonic acid,
Ar-[3-(3'-acryloxypropoxy)-propoxy]naphthalenedisulfonic acid,
Ar-[3-(3'-methacryloxypropoxy)-propoxy]naphthalenesulfonic acid,
Ar-[3-(3'-methacryloxypropoxy)-propoxy]naphthalenedisulfonic acid,
Ar-(5-acryloxypentyloxy)benzenesulfonic acid,
Ar-(6-methacryloxhexyloxy)benzenesulfonic acid, and the like, as well as the monovalent metal and ammonium sulfonate and disulfonate salts and the amine salts thereof. In producing the amine salts a wide variety of organic amines can be used. These organic amines are so well known to the ordinary chemist skilled in the art that it would be of no import to list them here.

Also included within the scope of this invention are the acylate salts of divalent metals, such as for example:

2-(acetoxybariumsulfophenoxy)ethyl acrylate,
2-(acetoxycadmiumsulfophenoxy)ethyl acrylate,
2-(acetoxyzincsulfophenoxy)ethyl acrylate,
2-(acetoxycalciumsulfophenoxy)ethyl acrylate,
2-(acetoxymagnesiumsulfophenoxy)ethyl acrylate,
2-(acetoxybariumsulfophenoxy)ethyl methacrylate,
2-(acetoxymagnesiumsulfophenoxy)ethyl methacrylate,
2-(acetoxyzincsulfophenoxy)ethyl chloroacrylate,
2-(butyroxycalciumsulfophenoxy)ethyl acrylate,
2-(propionoxycalciumsulfophenoxy)ethyl methacrylate,
2-(acetoxybariumsulfonaphthoxy)ethyl acrylate,
2-(acetoxycalciumsulfophenoxy)isopropyl acrylate,
3-(acetoxycalciumsulfophenoxy)propyl acrylate,
3-(butyroxyzincsulfophenoxy)propyl methacrylate,
3-(butyroxyzincsulfonaphthoxy)propyl acrylate,
4-(acetoxybariumsulfophenoxy)butyl acrylate,
2-[di-(acetoxybariumsulfo)naphthoxy]ethyl acrylate,
2-[2-(acetoxybariumsulfophenoxy)ethoxy]ethyl acrylate,
3-[2-(acetoxybariumsulfophenoxy)ethoxy]propyl methacrylate,
2-[3-(acetoxyzincsulfophenoxy)propoxy]ethyl acrylate,
3-[3-(propionoxycalciumsulfophenoxy)propoxy]propyl acrylate,
3-[3-propionoxycalciumsulfonaphthoxy)propoxy]propyl acrylate, and the like.

The acryloxyalkoxyaryl compounds used as starting materials in the sulfonation reaction of this invention are readily prepared either by the esterification of the acrylic acid compound and the corresponding alcohol or by a transesterification reaction between a lower ester of the acrylic acid compound with the corresponding alcohol. For example, 2-phenoxyethyl methacrylate can be prepared by an ester exchange reaction between 2-phenoxyethanol and a 2 to 3 mole excess of methyl methacrylate in the presence of a transesterification catalyst such as tetrabutyl titanate. During the esterification or transesterification reaction a polymerization inhibitor, for example, the monomethyl ether of hydroquinone, can be present. The transesterification can, for example, be carried out at a reaction temperature of about 115° C. under a slightly reduced pressure, and the by-product methanol is removed azeotropically with methyl methacrylate as it is formed in order to drive the reaction to completion. Upon completion of the transesterification reaction, the 2-phenoxyethyl methacrylate was recovered by fractional distillation.

The following examples further serve to illustrate the process of this invention.

*Example 1*

To a 500 milliliter Pyrex flask equipped with a stirrer and thermometer there was charged 40 grams of 2-phenoxyethyl acrylate, 160 grams of acetonitrile, and 44 grams of acetic anhydride. The reaction mixture was cooled to 5° C. in an ice water bath and 20.5 grams of concentrated sulfuric acid (98 to 99 percent) was added in a dropwise manner over a twenty-minute period. The mole ratio of acetic anhydride to sulfuric acid was 2.05 to 1. The reaction mixture was stirred at about 5° C. for an additional three hours. The free acid, ar-(2-acryloxyethoxy)benzenesulfonic acid, is recovered by concentrating the reaction mixture by distillation of the diluents therefrom. A 66 gram portion of the reaction mixture before concentration was treated with 6 grams of sodium acetate and sodium ar-(2-acryloxyethoxy)benzenesulfonate precipitated. The precipitated sodium ar-(2-acryloxyethoxy)benzenesulfonate was recovered by filtration, washed thoroughly with acetonitrile, and dried.

In a similar manner ar-[2-(2'-acryloxyethoxy)ethoxy]benzenesulfonic acid and the sodium and potassium salts thereof are prepared by substitution of 2-phenoxyethoxyethyl acrylate for 2-phenoxyethyl acrylate.

*Example 2*

To a Pyrex flask there were charged 10 grams of 2-(ortho-nitrophenoxy)ethyl acrylate, 40 grams of acetonitrile, and 10 grams of acetic anhydride. The reaction mixture was cooled to 5° C. and 4.14 grams of concentrated sulfuric acid was added in dropwise manner at 5° C. to 10° C. over a twenty-minute period. The mole ratio of acetic anhydride to sulfuric acid was about 2.3 to 1. The reaction mixture was stirred at the indicated temperature for an additional three hours. A small portion was removed and concentrated to yield the free acid ar-(2-acryloxyethoxy)nitrobenzenesulfonic acid. The remainder of the reaction mixture was treated with 4.14 grams of potassium acetate, stirred for about thirty minutes, and then allowed to stand overnight. The precipitated potassium ar-(2-acryloxyethoxy)nitrobenzenesulfonate was recovered by filtration; it was washed with acetonitrile and dried under reduced pressure. A 100 percent yield was obtained.

*Example 3*

In a manner similar to that described in Example 2, 10 grams of 2-(ar-nonylphenoxy)ethyl methacrylate was sulfonated with 2.95 grams of concentrated sulfuric acid in a medium consisting of 40 grams of acetonitrile and 8 grams of acetic anhydride. Conversion to ar-(2-methacryloxyethoxy)nonylbenzenesulfonic acid was complete. The potassium salt was produced by reaction of the free acid with 2.95 grams of potassium acetate; and 5 grams of potassium ar-(2-methacryloxyethoxy)nonylbenzenesulfonate was obtained. The structure of this compound was confirmed by infrared analysis and microanalysis.

*Example 4*

In a manner similar to that described in Example 2, there was produced ar-(2-methacryloxyethoxy)p-t-butylbenzenesulfonic acid by the sulfonation of 10 grams of 2-(p-t-butylphenoxy)ethyl methacrylate with 3.89 grams of concentrated sulfuric acid in a medium consisting of 11 grams of acetic anhydride and 40 grams of acetonitrile. The potassium salt was produced by reaction of the free acid with potassium acetate, also as described in Example 2. The yield of potassium ar-(2-methacryloxyethoxy)p-t-butylbenzenesulfonate was 8.5 grams and the structure was confirmed by infrared analysis.

*Example 5*

A reaction vessel was charged with 91 parts of 2-phenoxyethyl methacrylate and 94.5 parts of acetic anhydride. The mixture was cooled to 0° C. to 5° C. and 43.3 parts of sulfuric acid was added over a six-hour period. The reaction mixture was stirred at about 5° C. for about twenty-one hours. There was produced ar-(2-methacryloxyethoxy)benzenesulfonic acid. The solution was treated with 225 parts of a 7.9 percent aqueous sodium hydroxide solution at a temperature of from 7° to 21° C. over a period of six hours. The reaction mixture was then stirred for another two and one half hours and the solution of sodium ar-(2-methacryloxyethoxy)benzenesulfonate was stored as is for further use.

*Example 6*

To a Pyrex flask there were charged 110 grams of acetic anhydride and 51 grams of 2-(2-naphthyloxy)ethyl methacrylate. The reaction mixture was cooled to 10° C. and 19.6 grams of concentrated sulfuric acid was added in a dropwise manner at that temperature. The reaction mixture was stirred for four hours at 5° C. to 10° C., allowed to stand overnight at −10° C., and stirred at room temperature for three hours to produce ar-(2-acryloxyethoxy)naphthalenesulfonic acid. Then 19.6 grams of potassium acetate was added, and the potassium ar-(2-acryloxyethoxy)naphthalenesulfonate was precipitated by the addition of isopropyl ether. The product was filtered and dried; yield was 49 grams. Microanalysis, calculated for $C_{15}H_{13}O_6SK$: C, 44.7 percent; H, 4.02 percent; S, 9.36 percent; found: C, 44.3 percent; H, 3.83 percent; S, 8.89 percent.

*Example 7*

In a manner similar to that described in Example 6, 51 grams of 2-(2-naphthyloxy)ethyl methacrylate was sulfonated with 39.2 grams of sulfuric acid using 110 grams of acetic anhydride to produce ar-(2-acryloxyethoxy)naphthalenedisulfonic acid. The potassium salt was produced therefrom using 39.2 grams of potassium acetate. The yield of dipotassium ar-(2-acryloxyethoxy) napthalenedisulfonate was 63 grams. Microanalysis, calculated for $C_{15}H_{12}O_9S_2K_2$: C, 35.7 percent; H, 3.35 percent; S, 11.9 percent; found: C, 35.64 percent; H, 3.19 percent; S, 11.9 percent.

*Example 8*

An additional number of salts of ar-(2-acryloxyethoxy)benzenesulfonic acid were prepared in a manner similar to that described in Example 2 by the reaction of the free acid with a metal salt or with an organic amine. The following table sets forth the metal salt or amine used and the product produced:

| | |
|---|---|
| Sodium acetate | Sodium ar-(2-acryloxyethoxy) benzenesulfonate. |
| Potassium acetate | Potassium ar-(2-acryloxyethoxy)benzenesulfonate. |
| Magnesium acetate | 2-(acetoxymagnesiumsulfophenoxy)ethyl acrylate. |
| Barium acetate | 2-(acetoxybariumsulfophenoxy)ethyl arcylate. |
| Cadmium acetate | 2-(acetoxycadmiumsulfophenoxy)ethyl acrylate. |
| Manganese acetate | 2-(acetoxymanganesesulfophenoxy)ethyl acrylate. |
| Triethylamine | Triethylamine salt of ar-(2-acryloxy)-benzenesulfonic acid. |
| Glycine | Glycine salt of ar-(2-acryloxyethoxy)benzenesulfonic acid. |
| Di-2-ethylhexylamine | Di-2-ethylhexylamine salt of ar - (2-acryloxyethoxy)benzenesulfonic acid. |

What is claimed is:

1. A method for producing acryloxyalkoxyarylsulfonic acids represented by the general formula:

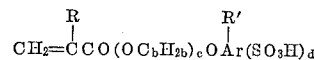

wherein R represents a member selected from the group consisting of a hydrogen atom, a chlorine atom, and a methyl consisting of a hydrogen atom, a chlorine atom, and a methyl radical; R' represents a member selected from the group consisting of a halogen atom, a nitro radical, and an alkyl radical containing from 1 to 12 carbon atoms; Ar represents a member selected from the group consisting of a polyvalent phenyl radical, and a polyvalent naphthyl radical; b is in integer having a value of from 1 to 4; c is an integer having a value of from 1 to 3; and d is an integer having a value of from 1 to 2; which comprises sulfonating an acryloxyalkoxyaryl compound represented by the general formula:

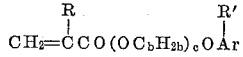

with an acetic anhydride-sulfuric acid reagent in which the mole ratio of acetic anhydride to concentrated sulfuric acid is from 1.5 to 1 to 2.75 to 1 and the temperature is from about −15° C. to about 20° C.

2. The method of claim 1 in which the mole ratio of acetic anhydride to concentrated sulfuric acid is about 2 to 1, and in which Ar is a phenylene radical.

3. The method of claim 1 in which the mole ratio of acetic anhydride to concentrated sulfuric acid is about 2 to 1, and in which Ar is a naphthylene radical.

References Cited in the file of this patent

UNITED STATES PATENTS

| 2,828,334 | De Groote | Mar. 25, 1958 |
| 3,024,221 | Le Fevre et al. | Mar. 6, 1962 |
| 3,033,833 | Le Fevre et al. | May 8, 1962 |

OTHER REFERENCES

Conant and Blatt: "The Chemistry of Organic Compounds," 4th ed. (1952), p. 549.

UNITED STATES PATENT OFFICE
CERTIFICATE OF CORRECTION

Patent No. 3,114,767　　　　　　　　　　　　December 17, 1963

Edward M. La Combe et al.

It is hereby certified that error appears in the above numbered patent requiring correction and that the said Letters Patent should read as corrected below.

Column 6, line 25, for "acryloxy)-benzenesulfonic" read -- acryloxyethoxy)-benzenesulfonic --; lines 41 and 42, strike out "consisting of a hydrogen atom, a chlorine atom, and a methyl".

Signed and sealed this 20th day of July 1965.

(SEAL)
Attest:

ERNEST W. SWIDER
Attesting Officer

EDWARD J. BRENNER
Commissioner of Patents